(No Model.)
H. JOHNSON.
ANTI-FRICTION GUIDE FOR SIGNAL RODS.
No. 442,810. Patented Dec. 16, 1890.
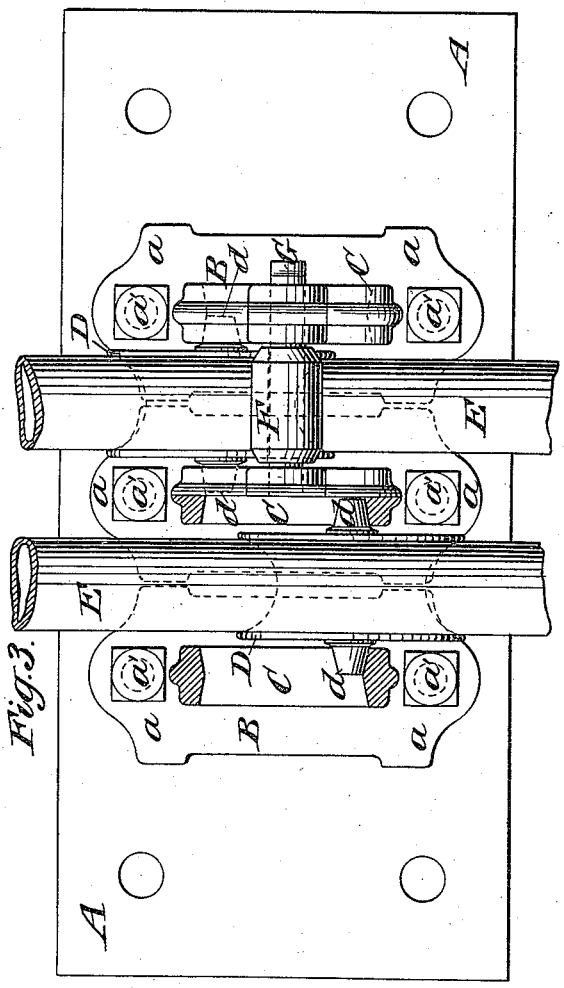
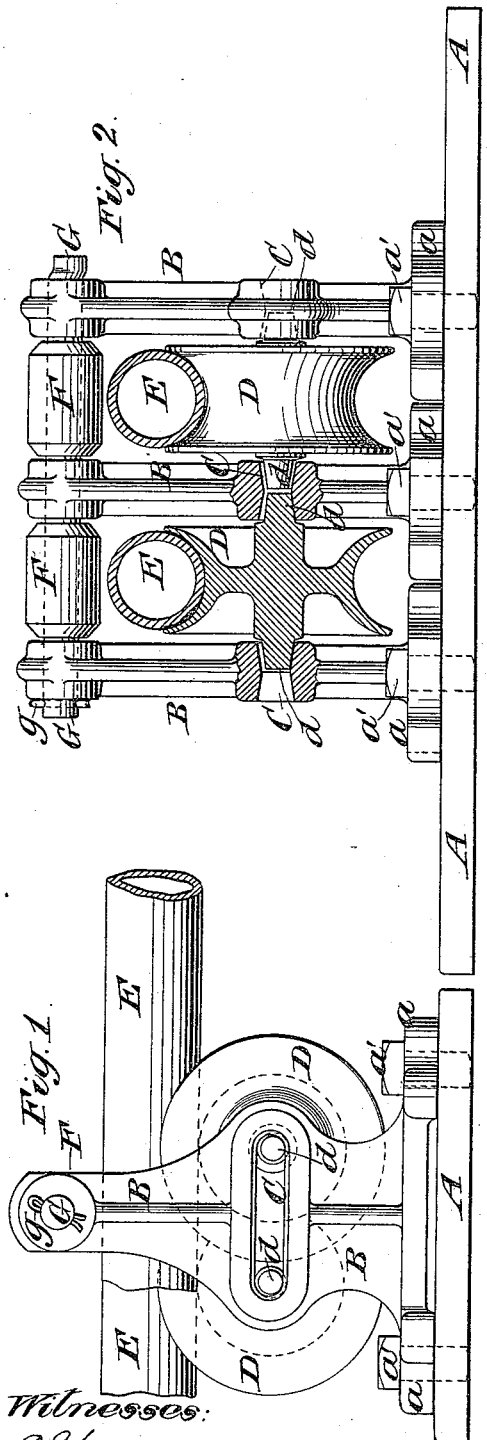
Witnesses:
C. Sundgren
D. H. Haynard
Inventor:
Henry Johnson
by his attorneys
Brown & Griswold
THE NORRIS PETERS CO., PHOTO-LITHO., WASHINGTON, D. C.

UNITED STATES PATENT OFFICE.

HENRY JOHNSON, OF RAHWAY, NEW JERSEY.

ANTI-FRICTION GUIDE FOR SIGNAL-RODS.

SPECIFICATION forming part of Letters Patent No. 442,810, dated December 16, 1890.

Application filed March 29, 1890. Serial No. 345,834. (No model.)

*To all whom it may concern:*

Be it known that I, HENRY JOHNSON, of Rahway, in the county of Union and State of New Jersey, have invented a certain new and useful Improvement in Anti-Friction Guides for Signal-Rods, of which the following is a specification.

My improvement relates to guides for "signal-rods," so-called, which are employed for operating railway-signals, switches, &c.

I will describe in detail a guide for signal-rods embodying my improvement, and then point out the novel features in claims.

In the accompanying drawings, Figure 1 is a side elevation of guides for signal-rods embodying my improvement. Fig. 2 is an end view of the same, partly in section. Fig. 3 is a plan view of the same, also partly in section.

Similar letters of reference designate corresponding parts in all the figures.

A designates a base, which may be of wood or metal, as desired.

B designates standards or uprights. These standards or uprights are provided at their lower ends with plate-like portions $a$, having suitable apertures through which bolts, spikes, screws, or similar securing devices $a'$ may be introduced for securing the said standards or uprights to the base A.

In the example of my improvement shown three standards or uprights are employed; but I may employ two or any desired number more than two. It will be observed that the said standards are made separate from each other, and they are separately secured to the base A side by side. In the standards, and as shown at about midway in their heights, are formed horizontally-extending slots C, which slots extend through the standards in this example of my improvement from side to side. They need not, however, extend wholly through. Such slots constitute elongated bearings for journals $d$ of pulleys D, said journals, when a pulley is in place between two of the standards, extending into each of the elongated bearings C. It will also be seen that the elongated bearings C are closed upon their tops and bottoms and at their ends. This construction is advantageous, because it prevents the canting of the pulleys due to the passage of the signal-rods E around curves. By making the standards separate from each other provision is afforded for the use of elongated bearings, which are thus closed, for the reason that in order to secure a pulley in the bearings it is but necessary to first separate the standards, insert one of the journals $d$ in one of the bearings C, and then move the other standard up into a position where it will receive within its bearing C the other of the journals $d$. Both said standards may be then secured to the base A so as to retain the pulley in position. The elongated bearings admit of the rolling of the pulley along for a distance within the standards, as well as of its rotation when longitudinal movement is imparted to the rod E. By this means friction is reduced.

Of course by my construction and arrangement of the parts any desired number of guides for rods E may be secured upon a standard, as all that is necessary is to add to or take from the number of standards and pulleys by simply securing additional standards to the base or detaching them therefrom.

The pulleys D are peripherically grooved to receive cylindrical signal-rods, and above the signal-rods are retaining-rollers F, which prevent the signal-rods from being accidentally displaced from the guides. The rollers F are, as shown, mounted upon a rod G, which extends through suitable apertures formed in and near the upper ends of the standards B. The rollers, as shown, are loose upon the rod G. When a sufficient number of guides have been arranged side by side, the rod G is passed through the standards and the rollers, and is secured against longitudinal movement, as shown, by a pin $g$ extending through one of the ends of said rod and by bending the other end of the rod.

What I claim as my invention, and desire to secure by Letters Patent, is—

1. The combination, with a base, of standards made separate from each other and secured to said base side by side, a pulley provided with journals received within elongated bearings in said standards, and a retaining-roller mounted in said standards above said pulley, substantially as specified.

2. The combination, with a base, of standards made separate from each other and secured to said base side by side, a pulley provided with journals received within elongated bearings in said standards, said bearings being closed upon their tops and bottoms and at their ends, and a retaining-roller mounted in said standards above said pulley, substantially as specified.

HENRY JOHNSON.

Witnesses:
FREDK. HAYNES,
GEORGE BARRY.